A. KINGSBURY.
COLLECTOR RING FOR DYNAMO ELECTRIC MACHINES.
APPLICATION FILED JULY 28, 1909.

1,075,292.

Patented Oct. 7, 1913.

UNITED STATES PATENT OFFICE.

ALBERT KINGSBURY, OF PITTSBURGH, PENNSYLVANIA, ASSIGNOR TO WESTINGHOUSE ELECTRIC AND MANUFACTURING COMPANY, A CORPORATION OF PENNSYLVANIA.

COLLECTOR-RING FOR DYNAMO-ELECTRIC MACHINES.

1,075,292. Specification of Letters Patent. Patented Oct. 7, 1913.

Application filed July 28, 1909. Serial No. 509,967.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Collector-Rings for Dynamo-Electric Machines, of which the following is a specification.

My invention relates to dynamo-electric machines, and it has special reference to collector rings which are adapted for use with alternating current generators, rotary converters, unipolar generators and the like.

The object of my invention is to provide an improved collector ring structure which shall be simple and durable and which may be readily removed without being disconnected from the windings of the machine with which it is employed.

In my co-pending application, Serial No. 471,655, I have shown and described the rotating part of a unipolar dynamo-electric machine which is provided with a relatively large number of collector rings. When machines of this character are used for generating large quantities of electrical energy the current carried by the collector rings is very large and a large number of brushes are necessarily employed for collecting such current. Under these circumstances, the working surfaces of the rings are rapidly worn off but the connections between collector rings is such that it is extremely difficult to replace any of the rings, as they have ordinarily been constructed.

While the collector rings of my present invention are especially adapted for use under severe service conditions, such as those referred to above, they are by no means restricted to use with such machines, but are capable of general application.

According to my present invention, I provide an inner ring, to which the usual electrical connections are made, having an annular projection to which outer ring segments are secured by any suitable means.

Figure 1:
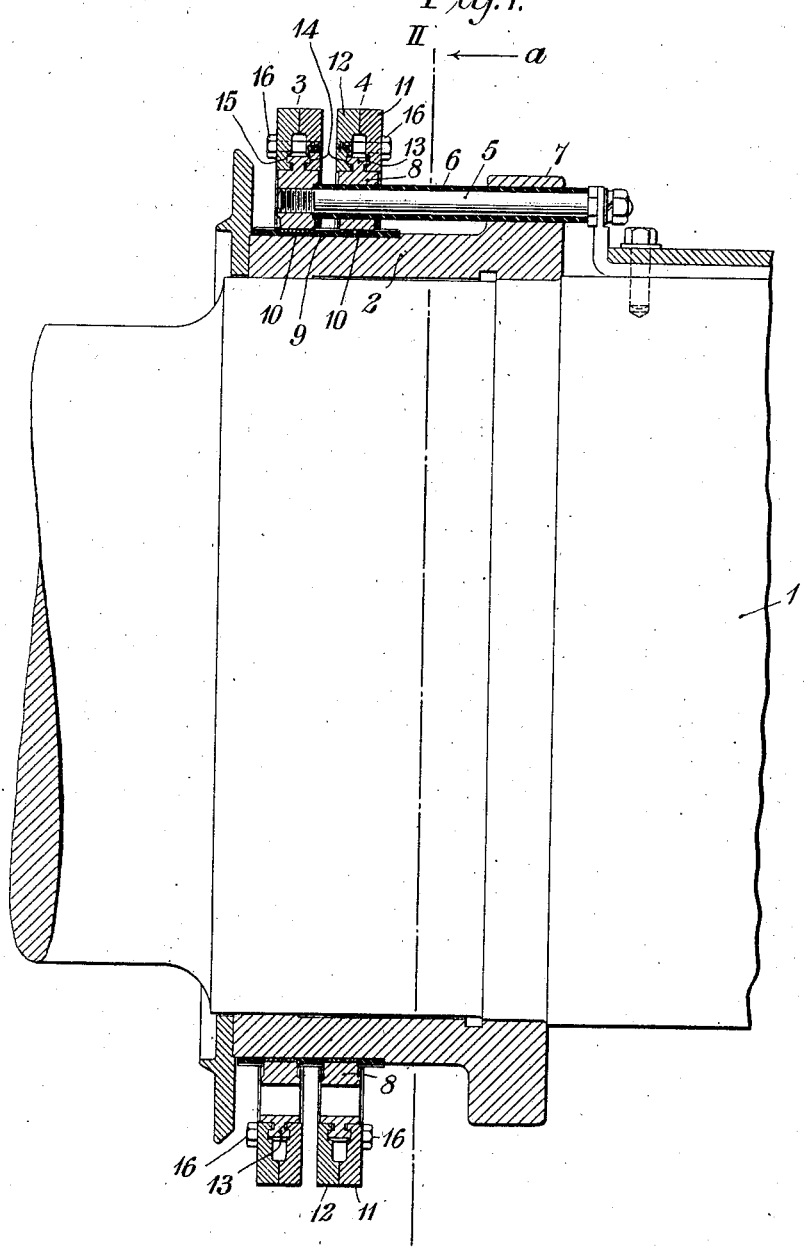
Figure 2:
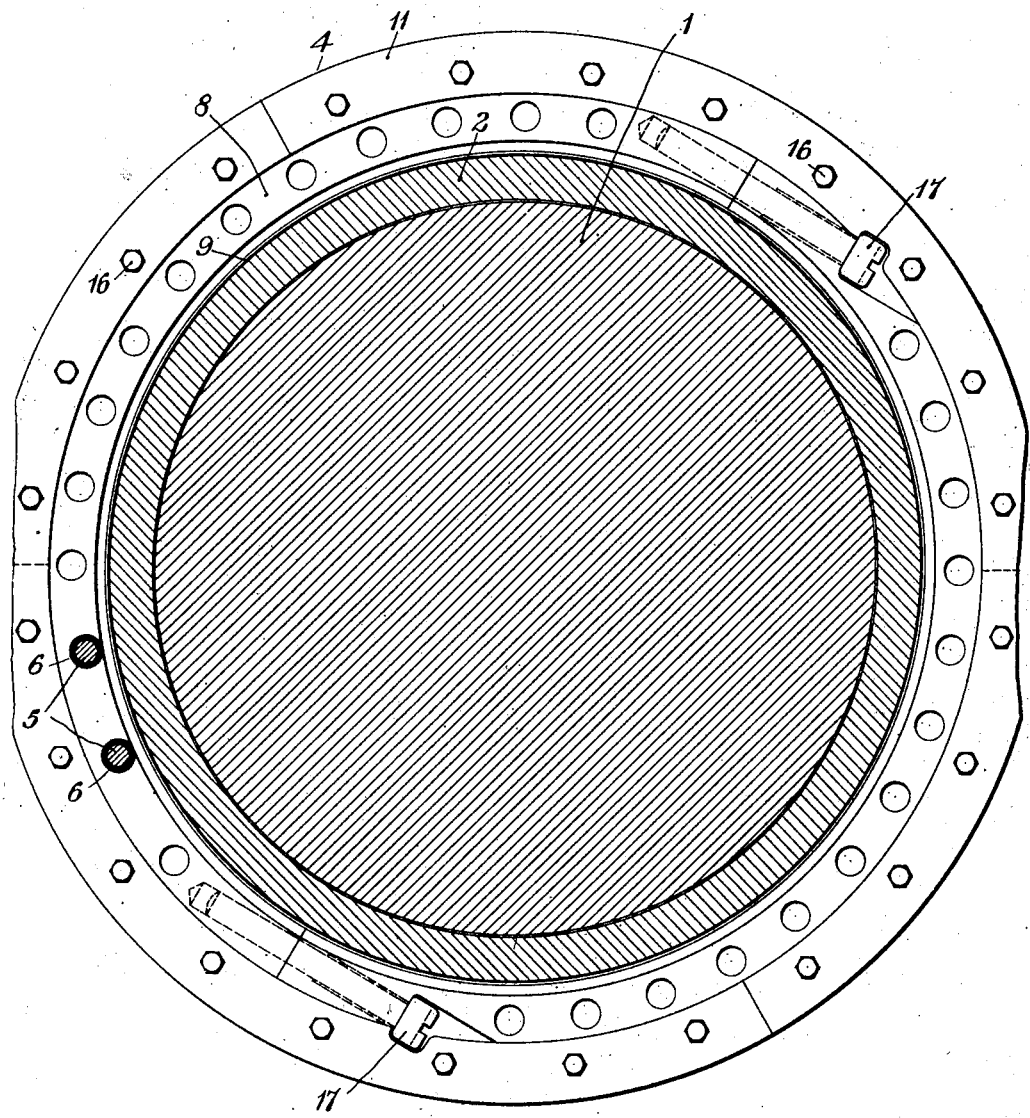
Figure 3:
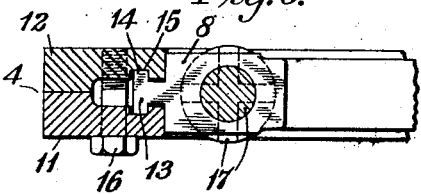

Figure 1 of the accompanying drawings is a sectional view of a portion of a dynamo-electric machine equipped with the collector rings of my invention. Fig. 2 is a transverse section on the line II—II of Fig. 1, looking in the direction of the arrow *a* and Fig. 3 is a detail view of a portion of one of the rings shown in the other figures.

Referring to the drawings, the structure here shown comprises a shaft 1, or other rotatable member, which forms part of a dynamo-electric machine, a sleeve or bushing 2 mounted thereon and collector rings 3 and 4 mounted on the sleeve or bushing and insulated therefrom. The rings may be connected to suitable points in the winding of the machine (not shown) by means of conducting rods 5 which are screw-threaded into the body of the ring to which connection is made. The rods 5 are insulated by tubes or sleeves 6 and are supported by an annular projection 7 on the sleeve 2. Each of the collector rings 3 and 4 comprises a body member 8 which is fitted upon the sleeve 2 after a wrapping 9 of insulation and a layer of band wire 10 for holding the same in position have been applied, and segmental contact rings 11 and 12. The body member 8 is provided with an annular projection 13 having flanges 14 which extend laterally from the end of the projection, making it substantially T-shaped in transverse section, as shown in Figs 1 and 3. The segmental rings 11 and 12 are assembled side by side and are provided with annular grooves 15 in their adjacent surfaces which are adapted to be engaged by the flanges 14 of the projections 13 on the body member of the collector ring. Each of the segmental rings may comprise any desired number of parts, but the two rings should be so assembled that the division lines between segments do not come opposite each other. When assembled, the two rings are clamped together by a plurality of bolts 16. The body portion of the collector ring may either be a continuous ring or it may be divided, as shown in Fig. 2 of the drawings, into two parts which are clamped together by bolts 17 that are tangentially arranged.

It is evident that either the body portion of the collector rings or the segmental rings which form the contact surfaces, or all of these parts, may be replaced by continuous rings within the spirit and scope of my invention.

I claim as my invention:

1. A collector ring for dynamo-electric machines comprising a metal body ring having an integral annular projection and a pair of contact rings seated on the body ring and clamped together upon said annular projection.

2. A collector ring for dynamo-electric machines comprising a metal body ring having an integral annular projection of dovetail section and a pair of segmental contact rings seated on the body ring and clamped together upon said annular projection.

3. A collector ring for dynamo-electric machines comprising a metal body ring having a peripheral projection and a pair of segmental contact rings removably secured together and to said peripheral projection.

4. A collector ring for dynamo-electric machines comprising a segmental body ring having tangential clamping bolts between segments and provided with an annular projection having lateral flanges, and a pair of segmental contact rings the adjacent surfaces of which are notched to register with the flanges on said annular projection, and transverse clamping bolts for securing the two contact rings to each other and to said annular projection.

In testimony whereof, I have hereunto subscribed my name this 19th day of July, 1909.

ALBERT KINGSBURY.

Witnesses:
W. L. WATERS,
B. B. HINES.